US012023542B2

(12) United States Patent
Beaver et al.

(10) Patent No.: US 12,023,542 B2
(45) Date of Patent: *Jul. 2, 2024

(54) TRAINING APPARATUS

(71) Applicant: Beaverfit Limited, Church Stretton (GB)

(72) Inventors: Richard James Beaver, Church Stretton (GB); Thomas Edward Beaver, Church Stretton (GB)

(73) Assignee: Beaverfit Limited, Shropshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,708

(22) Filed: Jan. 20, 2023

(65) Prior Publication Data

US 2023/0149769 A1 May 18, 2023

Related U.S. Application Data

(63) Continuation of application No. 17/162,925, filed on Jan. 29, 2021, now Pat. No. 11,559,719, which is a
(Continued)

(51) Int. Cl.
*A63B 21/16* (2006.01)
*A63B 1/00* (2006.01)
(Continued)

(52) U.S. Cl.
CPC .............. *A63B 21/169* (2015.10); *A63B 1/00* (2013.01); *A63B 17/00* (2013.01);
(Continued)

(58) Field of Classification Search
CPC . A63B 71/0036; A63B 1/00; A63B 21/00047; A63B 21/06; A63B 21/068;
(Continued)

(56) References Cited

U.S. PATENT DOCUMENTS

| 2,219,219 A | 10/1940 | Boger |
| 2,632,645 A | 3/1953 | Barkschat |

(Continued)

FOREIGN PATENT DOCUMENTS

| CN | 2768112 Y | 3/2006 |
| DE | 20110717 U1 | 9/2001 |

(Continued)

OTHER PUBLICATIONS https://www.youtube.com/watch?v=YH_h5CXoVkg, "BeaverFit Wall Mounted Power Rig at CrossFit Bath", Uploaded Aug. 27, 2010.
(Continued)

*Primary Examiner* — Jennifer Robertson
(74) *Attorney, Agent, or Firm* — Lippes Mathias LLP

(57) ABSTRACT

A training apparatus has exercise equipment mounted to a side surface or a roof of a land vehicle or for mounting to a surface such as a wall of a building or ship. The exercise equipment includes a support structure which is attached to the surface or roof. In some embodiments the support structure is maneuverable by pivoting with respect to the surface or roof, whilst remaining attached thereto, between a stowed condition and an exercising condition.

20 Claims, 6 Drawing Sheets

Related U.S. Application Data continuation of application No. 16/834,337, filed on Mar. 30, 2020, now Pat. No. 10,918,902, which is a continuation of application No. 15/006,813, filed on Jan. 26, 2016, now Pat. No. 10,625,111.

(51) Int. Cl.
| | | |
|---|---|---|
| *A63B 17/00* | (2006.01) | |
| *A63B 21/06* | (2006.01) | |
| *A63B 23/02* | (2006.01) | |
| *A63B 23/035* | (2006.01) | |
| *A63B 23/04* | (2006.01) | |
| *A63B 23/12* | (2006.01) | |
| *A63B 71/00* | (2006.01) | |
| *B60S 9/02* | (2006.01) | |

(52) U.S. Cl.
CPC .... *A63B 23/0216* (2013.01); *A63B 23/03558* (2013.01); *A63B 23/0405* (2013.01); *A63B 23/1218* (2013.01); *A63B 71/0036* (2013.01); *B60S 9/02* (2013.01); *A63B 21/06* (2013.01); *A63B 2023/0411* (2013.01); *A63B 2210/50* (2013.01); *A63B 2225/093* (2013.01)

(58) Field of Classification Search
CPC .............. A63B 21/169; A63B 23/0216; A63B 23/03558; A63B 23/0405; A63B 23/1218; A63B 2023/0411; A63B 2210/50; A63B 17/00

See application file for complete search history.

(56) References Cited

U.S. PATENT DOCUMENTS

| | | |
|---|---|---|
| 2,682,402 A | 6/1954 | McCarthy |
| 2,855,200 A | 10/1958 | Blickman |
| 3,275,369 A | 9/1966 | Ecke |
| 3,295,847 A | 1/1967 | Matt, Sr. |
| 3,501,140 A | 3/1970 | Eichorn |
| 3,664,666 A | 5/1972 | Lloyd |
| 3,874,657 A | 4/1975 | Niebojewski |
| 4,300,761 A | 11/1981 | Howard |
| 4,431,181 A | 2/1984 | Baswell |
| 4,637,608 A | 1/1987 | Owens et al. |
| D289,782 S | 5/1987 | Szymski et al. |
| D290,033 S | 5/1987 | Policastro |
| 4,759,539 A | 7/1988 | Nieppola |
| 4,815,746 A | 3/1989 | Ward, Jr. |
| 4,828,255 A | 5/1989 | Lahman |
| 4,907,798 A | 3/1990 | Burchatz |
| 4,921,245 A | 5/1990 | Roberts |
| 4,927,135 A | 5/1990 | Nieppola |
| 4,958,874 A | 9/1990 | Hegedus |
| 4,976,428 A | 12/1990 | Ghazi |
| 4,976,623 A | 12/1990 | Owsley |
| 5,013,035 A | 5/1991 | Nathaniel |
| 5,046,722 A | 9/1991 | Antoon |
| D321,735 S | 11/1991 | Blubaugh |
| 5,242,345 A | 9/1993 | Mitchell |
| D356,351 S | 3/1995 | Watts |
| 5,405,306 A | 4/1995 | Goldsmith et al. |
| 5,449,336 A | 9/1995 | Sabel |
| 5,466,204 A | 11/1995 | Nearing |
| D368,288 S | 3/1996 | Kasbohm |
| 5,542,897 A | 8/1996 | Hall |
| 5,569,167 A | 10/1996 | Friedli |
| 5,573,238 A | 11/1996 | Aaron et al. |
| 5,575,742 A | 11/1996 | Wu |
| 5,626,546 A | 5/1997 | Little |
| D381,715 S | 7/1997 | Reeder |
| 5,667,267 A | 9/1997 | Talucci |
| 5,667,461 A | 9/1997 | Hall |
| 5,683,074 A | 11/1997 | Purvis et al. |
| 5,816,646 A | 10/1998 | Combest |
| D401,985 S | 12/1998 | Wheeler |
| D408,480 S | 4/1999 | Haugo |
| 5,966,956 A | 10/1999 | Morris et al. |
| 5,971,898 A | 10/1999 | Schoolfield |
| 5,997,442 A | 12/1999 | Cordes |
| 6,027,429 A | 2/2000 | Daniels |
| D425,152 S | 5/2000 | Ceppo |
| 6,090,021 A | 7/2000 | Flowers et al. |
| 6,093,136 A | 7/2000 | Whipple |
| D439,641 S | 3/2001 | Dumas |
| D441,813 S | 5/2001 | Ceppo |
| 6,238,320 B1 | 5/2001 | Flanagan |
| 6,245,001 B1 | 6/2001 | Siaperas |
| 6,264,586 B1 | 7/2001 | Webber |
| 6,273,846 B1 | 8/2001 | Savage et al. |
| 6,279,880 B1 | 8/2001 | Hawks, Jr. |
| 6,280,361 B1 | 8/2001 | Harvey et al. |
| 6,345,471 B1 | 2/2002 | Gyllenhammar |
| 6,350,221 B1 | 2/2002 | Krull |
| 6,357,548 B1 | 3/2002 | Boyd |
| 6,422,981 B1 | 7/2002 | Riser |
| 6,454,683 B1 | 9/2002 | Kaye |
| 6,520,890 B2 | 2/2003 | Hsu |
| 6,554,747 B1 | 4/2003 | Rempe |
| 6,558,301 B1 | 5/2003 | Jackson |
| 6,612,845 B1 | 9/2003 | Macri et al. |
| 6,634,998 B2 | 10/2003 | Siaperas |
| 6,749,549 B1 | 6/2004 | Chu |
| D495,380 S | 8/2004 | Ceppo |
| D495,381 S | 8/2004 | Ceppo |
| D495,383 S | 8/2004 | Ceppo |
| 6,881,178 B1 | 4/2005 | Goldberg |
| D514,808 S | 2/2006 | Morine et al. |
| 7,070,547 B1 | 7/2006 | Pater |
| D539,138 S | 3/2007 | Mittelstaedt et al. |
| D544,554 S | 6/2007 | Brun |
| 7,311,642 B2 | 12/2007 | Li et al. |
| D563,490 S | 3/2008 | Prenatt |
| D565,132 S | 3/2008 | Lien et al. |
| D582,674 S | 12/2008 | Meyerspeer |
| 7,488,277 B1 | 2/2009 | Knapp |
| 7,520,840 B2 | 4/2009 | Shifferaw |
| D597,614 S | 8/2009 | Goddard |
| D597,834 S | 8/2009 | Mittelstaedt et al. |
| 7,575,538 B1 | 8/2009 | Clark |
| 7,614,988 B1 | 11/2009 | Kiser |
| 7,758,477 B2 | 7/2010 | Prenatt |
| 7,930,857 B2 | 4/2011 | Pope |
| D638,217 S | 5/2011 | von Gottberg et al. |
| 8,231,511 B2 | 7/2012 | Dalcourt |
| D666,259 S | 8/2012 | Garcia |
| D671,997 S | 12/2012 | Lien |
| D672,414 S | 12/2012 | Januszek |
| D678,963 S | 3/2013 | James |
| 8,485,951 B1 | 7/2013 | Adams |
| 8,597,026 B2 | 12/2013 | Cincotti et al. |
| D701,044 S | 3/2014 | Kishimoto |
| D708,682 S | 7/2014 | Jones et al. |
| 8,942,321 B2 | 1/2015 | Shental et al. |
| D727,444 S | 4/2015 | Dixon |
| D731,601 S | 6/2015 | Bradley et al. |
| D740,025 S | 10/2015 | Phan et al. |
| D740,026 S | 10/2015 | Yamamoto |
| D750,890 S | 3/2016 | Quehl |
| 9,302,144 B1 | 4/2016 | Benavides |
| 9,320,934 B1* | 4/2016 | Pringle ................ A63B 21/068 |
| 9,675,831 B2 | 6/2017 | Beaver et al. |
| 9,700,761 B2 | 7/2017 | Beaver et al. |
| 10,398,937 B2 | 9/2019 | Beaver et al. |
| 10,525,306 B2 | 1/2020 | Beaver et al. |
| 10,625,111 B2* | 4/2020 | Beaver ................. A63B 1/00 |
| 10,918,902 B2* | 2/2021 | Beaver ................. A63B 17/00 |
| 11,559,719 B2* | 1/2023 | Beaver ............ A63B 23/03558 |
| 2002/0035016 A1 | 3/2002 | Weiss |
| 2002/0078861 A1 | 6/2002 | David |
| 2002/0104987 A1 | 8/2002 | Purvis |
| 2003/0030279 A1 | 2/2003 | Campion |
| 2003/0119611 A1 | 6/2003 | Lytle et al. |

(56) References Cited

U.S. PATENT DOCUMENTS

| | | |
|---|---|---|
| 2003/0146212 A1 | 8/2003 | Mai et al. |
| 2003/0213188 A1 | 11/2003 | Bigelow |
| 2004/0041141 A1 | 3/2004 | Cannon |
| 2004/0082445 A1 | 4/2004 | Zabel |
| 2004/0237870 A1 | 12/2004 | Clarke et al. |
| 2005/0032612 A1 | 2/2005 | Keiser |
| 2005/0032613 A1 | 2/2005 | Wehrell |
| 2006/0019799 A1 | 1/2006 | Checketts |
| 2006/0052220 A1 | 3/2006 | Jackson et al. |
| 2006/0101727 A1 | 5/2006 | Holgerson et al. |
| 2006/0145514 A1 | 7/2006 | Cardwell et al. |
| 2006/0186638 A1 | 8/2006 | Varner |
| 2006/0199706 A1 | 9/2006 | Wehrell |
| 2006/0228201 A1 | 10/2006 | Lenceski |
| 2006/0293156 A1 | 12/2006 | Trees |
| 2007/0032357 A1 | 2/2007 | Piane, Jr. |
| 2007/0113487 A1 | 5/2007 | Warminsky |
| 2007/0117503 A1 | 5/2007 | Warminsky |
| 2007/0161468 A1 | 7/2007 | Yanagisawa et al. |
| 2007/0232461 A1 | 10/2007 | Jenkins et al. |
| 2008/0128463 A1 | 6/2008 | Bryan |
| 2009/0017997 A1 | 1/2009 | Piggins |
| 2009/0023566 A1 | 1/2009 | Florczak |
| 2009/0069125 A1 | 3/2009 | Porter |
| 2009/0072111 A1 | 3/2009 | Piane, Jr. |
| 2009/0098987 A1 | 4/2009 | McBride et al. |
| 2009/0124464 A1 | 5/2009 | Kastelic |
| 2009/0131230 A1 | 5/2009 | Cole |
| 2009/0143160 A1 | 6/2009 | Hoganson |
| 2009/0176588 A1 | 7/2009 | Lochtefeld |
| 2009/0215594 A1 | 8/2009 | Panaiotov |
| 2009/0282749 A1 | 11/2009 | Warminsky |
| 2010/0024316 A1 | 2/2010 | Pope |
| 2010/0048368 A1 | 2/2010 | Donofrio |
| 2010/0124996 A1 | 5/2010 | Lindsay |
| 2010/0251584 A1 | 10/2010 | Bey et al. |
| 2010/0300906 A1 | 12/2010 | Moore |
| 2011/0023925 A1 | 2/2011 | Johnson et al. |
| 2011/0152046 A1 | 6/2011 | Rochford |
| 2011/0171623 A1 | 7/2011 | Cincotti et al. |
| 2011/0195822 A1 | 8/2011 | Donofrio |
| 2011/0319230 A1 | 12/2011 | Brendle |
| 2012/0077429 A1 | 3/2012 | Wernimont et al. |
| 2012/0142506 A1 | 6/2012 | Hetrick et al. |
| 2012/0144762 A1 | 6/2012 | Eatock et al. |
| 2012/0214651 A1 | 8/2012 | Ross |
| 2013/0053220 A1 | 2/2013 | Monaco |
| 2014/0054247 A1 | 2/2014 | Scaramucci |
| 2014/0106310 A1 | 4/2014 | Cincotti et al. |
| 2015/0014212 A1 | 1/2015 | Beaver et al. |
| 2015/0059257 A1 | 3/2015 | Beaver et al. |
| 2015/0283416 A1 | 10/2015 | Bloemker |
| 2015/0290488 A1 | 10/2015 | Hopperstad et al. |
| 2016/0059104 A1 | 3/2016 | Monaco |
| 2016/0059105 A1 | 3/2016 | Scade Garcia |
| 2017/0209733 A1 | 7/2017 | Beaver et al. |

FOREIGN PATENT DOCUMENTS

| | | | | |
|---|---|---|---|---|
| EP | 0384702 A1 | 8/1990 | | |
| FR | 2 959 670 A1 | 11/2011 | | |
| GB | 648641 A | 1/1951 | | |
| GB | 2 463 092 A | 3/2010 | | |
| GB | 2 503 733 A | 1/2014 | | |
| WO | WO 2009/029706 | 3/2009 | | |
| WO | WO 2010/070307 | 6/2010 | | |
| WO | WO2013/000020 | 1/2013 | | |
| WO | WO 2014/013011 A1 | 1/2014 | | |
| WO | WO 2014/027086 A1 | 2/2014 | | |
| WO | WO-2014027086 A1 * | 2/2014 | ............ | A63B 17/00 |
| WO | WO 2014/046904 A1 | 3/2014 | | |
| WO | WO 2014/169042 A1 | 10/2014 | | |
| WO | WO 2016/176733 A1 | 11/2016 | | |
| WO | WO-2016176733 A1 * | 11/2016 | ............ | A63B 17/02 |

OTHER PUBLICATIONS

The Tactical Gym Box by Tacwrk Blog dated Apr. 10, 2014, Found online [Feb. 5, 2016], http://www.tacwrk.com/blog/5-11-recon-serie/2014/04, 6 pages.

https://www.youtube.com/watch?v=MsDAULtypz4, Jul. 2, 2012 [Accessed Dec. 3, 2014] 1 page.

https://crossfitpenrith.blogspot.co.uk/2009/08/rest-day.html#comment-form, Aug. 2, 2009 [Accessed Dec. 3, 2014] 1 page.

https://www.youtube.com/watch?v=CU0XFPtUepA, Red Reebok/CrossFit Containers, 3 screen grabs, Feb. 2, 2018.

https://www.archdaily.com/216867/vissershok-container-classroom-tsai-design-studio, Vissershok Container Classroom / Tsai Design Studio, Oct. 24, 2017, pp. 1-9.

https://inhabitat.com/the-vissershok-school-is-a-colorful-shipping-container-classroom-for-kids-in-south-africa/, The Vissershok School is a Colorful Shipping Container Classroom for Kids in South Africa, Oct. 24, 2017, pp. 1-5.

https://www.treehugger.com/modular-design/shipping-containers-being-used-everywhere-for-everything.html., "Shipping Containers Being Used Everywhere for Everything", Oct. 24, 2017, pp. 1-7.

http://blog.adidas-group.com/2012/04/reebok%e2%80%99s-%e2%80%9cdrop-box%e2%80%9d-journey-continues-to-grow-fitness/, "Reebok's "drop box" journey continues to grow fitness", Apr. 20, 2012, 4 pages.

https://blog.roguefitness.com/2012/03/rogue-3x3-monster-racks-are-coming/, "Rogue 3 X 3 Monster Racks are Coming", Apr. 2, 2018, 1 page.

https://blog.roguefitness.com/2012/04/squat-stands-racks-and-rigs-3/, "Squat Stands, Racks and Rigs 3", Apr. 2, 2018, 1 page.

AirSource Military, Aug. 27, 2014, "Air Guardsman—Rapelling and Fast Rope Use", youtube.com, [online], Available from: https://www.youtube.com/watch?v=_YoeBY4nSzuQ [Accessed Sep. 26, 2016] See whole video, especially 3:00 to 3:40.

Beaverfit, 2010-2016, "BeaverFit Training Equipment", beaverfiteu.com, [online], Available from:https://web.archive.org/web/201605 111 74256/http://www.beaverfiteu.com/ [Accessed Sep. 26, 2016] Applicant's prior art. See Operational Lockers—Custom Lockers.

Beaver Fit Website, "Ammo Cans", Accessed Apr. 7, 2016. (http://www.beaverfitusa.com/ammo-cans/) p. 1 indicated with red arrow.

google.com image search, "Ammunition can", Search performed on Apr. 7, 2016.

amazon.com, "German MG 34/42 Ammunition Can in Postwar Green", Accessed Apr. 7, 2016, (http://www.amazon.com/German-Ammunition-Postwar-Green-Unmarked/dp/B00655CNPE).

* cited by examiner

TRAINING APPARATUS

BACKGROUND

This application is a continuation of U.S. patent application Ser. No. 17/162,925 which was filed on Jan. 29, 2021 and is still pending. That application, in turn, is a continuation of U.S. patent application Ser. No. 16/834,337 which was filed on Mar. 30, 2020 and has issued on Feb. 16, 2021 as U.S. Pat. No. 10,918,902. That application, in turn, is a continuation of U.S. patent application Ser. No. 15/006,813 which was filed on Jan. 26, 2016 and has issued on Apr. 21, 2020 as U.S. Pat. No. 10,625,111. The disclosures of those applications are incorporated hereinto by reference in their entirety.

The invention relates to training apparatus.

It is known from WO2014/027086 to provide training apparatus comprising exercise equipment and a shipping container. Using a vehicle, the training apparatus is transported with the exercise equipment contained in the shipping container. After the training apparatus has been transported to a site where it is to be used for training, it is removed from the vehicle and the exercise equipment is unpacked from the shipping container and assembled by attachment to the outside of the shipping container. This type of training apparatus is readily transportable to a site where it is to be used, but time and effort are required to remove it from the vehicle used to transport it and to position it on the ground. After the training apparatus has been used, time and effort are also required to load it into or onto the vehicle before it is ready for transport.

It is known from U.S. Pat. No. 8,485,951 to provide vehicle mounted training apparatus which provides for resistance tube training.

BRIEF SUMMARY

According to a first aspect the invention provides training apparatus comprising a land vehicle provided with exercise equipment, wherein the exercise equipment comprises a support structure which, when in an exercising condition for use when the land vehicle is stationary, is attached to an outside surface of the land vehicle.

Because the training apparatus comprises a land vehicle, once the training apparatus has arrived at a site it is not necessary to unload the training apparatus and place it on the ground, nor is it necessary to reload it after use.

In an embodiment, the land vehicle is a trailer with wheels. The trailer can be transported by being towed on its wheels, and the wheels can remain in place when the trailer is stationary and the exercise equipment is being used for exercise. The trailer may comprise a box, such as an ISO shipping container. The exercise equipment can be used without having to remove the box from the wheels. The outside surface of the land vehicle may belong to a side wall or a roof of the trailer.

The support structure may be configured to engage the ground when it is in the exercising condition. The support structure may comprise a ground engaging leg. The ground engaging leg can improve the stability of the land vehicle during exercise by a user, for example by helping to prevent it from rocking on a suspension.

The support structure may comprise an arm member which projects away from the outside surface when the support structure is in the exercising condition.

When the support structure is in the exercising condition, at least a portion of the support structure may be spaced from the outside surface. The portion may be a support portion which provides support for an exercise bar so as to support the exercise bar horizontally.

The outside surface of the land vehicle may be a vertically extending outside surface, such as a side surface of a trailer.

The outside surface of the land vehicle may be a roof surface, such as roof surface of a trailer.

The exercise equipment may comprise cantilevered exercise apparatus having a cantilever component which projects away from the outside surface and does not engage the ground when the cantilevered exercise apparatus is in an exercising configuration. The cantilever component may extend upwardly in a direction intermediate between horizontal and vertical, when the cantilevered exercise apparatus is in the exercising configuration.

The land vehicle may comprise a trailer which comprises a container, and the exercise equipment may comprise cantilevered exercise apparatus which projects away from the container and does not engage the ground when the cantilevered exercise apparatus is in an exercising configuration, the cantilevered exercise apparatus having at least one exercise bar to be gripped by a user during exercise, and the cantilevered exercise apparatus having a distal end and a proximal end at which a container attachment portion of the cantilevered exercise apparatus is located, the container attachment portion at the proximal end of the cantilevered exercise apparatus being fixed to the container and the cantilevered exercise apparatus extending from the container attachment portion thereof upwardly in a direction intermediate between horizontal and vertical when the cantilevered exercise apparatus is in the exercising configuration.

Thus, the cantilevered exercise apparatus cantilevers out from the container and is supported only by the container, and not from the ground. It is therefore not necessary to assemble any ground engaging structure to support the cantilevered exercise apparatus, thereby assisting convenient deployment of the cantilevered exercise apparatus when it is required for exercise.

In embodiments, the proximal end of the cantilevered exercise apparatus, being at the "root" of the cantilever, is thus positioned at a container wall, i.e. the cantilevered exercise apparatus cantilevers out directly from a container wall. The wall may be a side or roof of the container or at a region where the side and the roof meet.

The support structure may be configured to adopt a stowed condition for use during locomotion of the land vehicle. The stowed condition may involve stowing the support structure elsewhere other than on the outside surface, i.e. elsewhere on the outside of the vehicle or inside the vehicle. For example, the stowed condition of the support structure may be a condition in which the support structure is inside the vehicle.

In embodiments, the support structure may be maneuverable by pivoting with respect to the outside surface of the land vehicle whilst remaining attached thereto, between a stowed condition for use during locomotion of the land vehicle, and the exercising condition for use when the land vehicle is stationary.

Thus, the support structure of the exercise equipment may be conveniently stowed during locomotion of the vehicle and may then be maneuvered by pivoting when the vehicle is stationary to an exercising condition allowing for the exercise equipment to be used.

In embodiments, the outside surface of the land vehicle may be a vertically extending outside surface, and the support structure may be maneuverable, whilst remaining attached to the vertically extending outside surface, between a stowed condition for use during locomotion of the land vehicle, and the exercising condition for use when the land vehicle is stationary.

Thus, during locomotion of the land vehicle the support structure of the exercise equipment may be conveniently attached to a vertically extending outside surface of the land vehicle, and then when it is desired to use the exercise equipment with the land vehicle stationary, the support structure may be maneuvered whilst remaining attached to the outside surface of the land vehicle to the exercising condition.

In embodiments, the support structure may be maneuverable between a stowed condition attached to the outside surface of the land vehicle for use during locomotion of the land vehicle, and the exercising condition attached to the outside surface of the land vehicle for use when the land vehicle is stationary, and the support structure may be configured to engage the ground when it is in the exercising condition.

Thus, in this arrangement, the exercise equipment is both attached to the outside of the land vehicle and in engagement with the ground when it is to be used. The exercise equipment may then be deployed in a stable manner.

In embodiments, the support structure is maneuverable between a stowed condition attached to a roof surface of the land vehicle for use during locomotion of the land vehicle, and the exercising condition attached to the roof surface of the land vehicle for use when the land vehicle is stationary.

With such an arrangement the support structure may be conveniently in the stowed condition attached to the roof surface of the land vehicle during locomotion thereof, and then when it is desired to use the exercise equipment with the land vehicle stationary the support structure can be conveniently maneuvered to the exercising condition.

In the above embodiments of the invention in which the support structure is stowed in a condition attached to the outside surface of the land vehicle, it is possible to move the training apparatus from one place to another and to use it for exercise in a very quick and convenient manner compared to the more time consuming process involved in the transport and use of known transportable training apparatus which has to be unpacked and then assembled.

The land vehicle may comprise a trailer and the outside surface or the roof surface may belong to the trailer. In some embodiments, the training apparatus may be transported by towing the trailer and can be used for exercise when the trailer is stationary by maneuvering the support structure from the stowed condition to the exercising condition. By providing the support structure in the stowed condition on the outside of the trailer, whether on a vertically extending side, front or rear wall thereof, or a roof surface thereof, it can readily be maneuvered to the exercising condition also attached to the same surface. After the exercise equipment has been used for exercise, the support structure can be easily stowed again so that the land vehicle, e.g. the trailer, is ready for transport.

The invention also extends to exercise equipment comprising a support structure adapted to be attached to a land vehicle to form training apparatus in accordance with any of the aspects or embodiments of the invention described herein. The various optional features of the exercise equipment may also be provided.

There are aspects of the present invention which are applicable more widely than to land vehicles, in particular being for mounting to any surface. In this much broader context, it is known from US 2015/0290488 to provide a retractable wall mounted exercise rack system having a pair of vertically oriented ground engaging legs which may be lifted and pivoted away from the ground when it is desired to retract the system to a position closer to a wall. Each leg is vertically oriented both when in a position for exercise and when retracted closer to the wall, i.e. the leg is in the same orientation when in the exercise position and when in the retracted position, so that it occupies the same amount of vertical space in both positions. The pivoting between the positions results in horizontal displacement of the leg but does not alter its orientation.

According to a second aspect, the invention provides a training apparatus comprising exercise equipment for mounting to a surface, wherein the exercise equipment comprises a support structure which is attachable to the surface and is maneuverable, whilst remaining so attached, between a stowed condition and an exercising condition, the support structure having a ground engaging leg which engages the ground and is in a first orientation when the support structure is in the exercising condition, and which is spaced from the ground and is in a second orientation different from the first orientation, so as to occupy less vertical space than when it is in the first orientation, when the support structure is in the stowed condition.

With such an arrangement, when the support structure is in the stowed condition its ground engaging leg occupies less vertical space than when the support structure is in the exercising condition. The training apparatus is therefore useful in situations where there is a restriction on the vertical space available for the training apparatus, for example on a ship when headroom is restricted or a basement or other gymnasium with restricted floor to ceiling space. It is also beneficial where the surface belongs to a land vehicle, such as a trailer, where the ground engaging leg requires a certain length to perform its function during exercise, but when the support structure is stowed it is desired that the ground engaging leg should not project, or should only project a small amount, beyond the dimensions of the land vehicle as viewed in elevation.

According to a third aspect the invention provides a training apparatus comprising exercise equipment for mounting to a surface, wherein the exercise equipment comprises a support structure which is attachable to the surface and is maneuverable, whilst remaining so attached, between a stowed condition and an exercising condition, the support structure having at least two ground engaging legs which engage the ground when the support structure is in the exercising condition, and which are spaced from the ground when the support structure is in the stowed condition, and wherein the ground engaging legs are independently maneuverable with respect to each other when the support structure is maneuvered between the stowed and exercising conditions.

By providing ground engaging legs which are independently maneuverable with respect to each other the weight of only one leg at a time needs to be dealt with during the maneuver. This in turn can avoid the need for any spring or actuator assistance if a ground engaging leg has to be maneuvered against its weight, thereby providing a simple design of support structure.

As with the second aspect, the third aspect of the invention is applicable both to a fixed surface, such as that of a ship or a gymnasium, as well as to a surface which belongs to a land vehicle such as a trailer.

Various optional features of the different aspects and embodiments of the invention are discussed below.

In embodiments having a stowed condition for the support structure, in the stowed condition the support structure may be adjacent to the surface.

More generally, in the exercising condition, at least a portion of the support structure may be spaced from the surface. By providing a support portion spaced from the surface, this can allow an adequate amount of space away from the surface for a user to exercise. The portion may be spaced from the surface by at least 50 cm or 60 cm or 70 cm or 80 cm or 90 cm or 1.0 m.

Such a support portion may provide support for an exercise bar. The exercise bar may be arranged so that it is spaced from the surface, for example a surface of a land vehicle such as a trailer. This can allow room for exercise below the bar without interference, e.g. from the land vehicle. The exercise bar may be arranged so that a space below it is uninterrupted between the bar and the ground (or other surface on which a person using the bar for exercise may stand). This will enable a user to use that space when exercising, for example to perform pull-ups.

The exercise bar may be gripped by a user during exercise. It may be horizontally arranged, for a user to carry out exercises such as pull-ups, toes to bar, or squats (using weights attached to the exercise bar). The exercise bar may be supported, by the support portion when the support structure is in the exercising condition, in a fixed position spaced from the surface. This is convenient for exercises such as pull-ups or toes to bar. Alternatively the exercise bar may carry weights and be liftable from the support portion, then being used for squats or other weight training exercises.

In embodiments having a stowed condition for the support structure, in the stowed condition the support structure may be stowed in a relatively compact manner adjacent to the surface, and then maneuvered to a less compact arrangement when the exercise equipment is to be used for exercising. In the stowed condition substantially the entire support structure may be in a collapsed state in which it lies adjacent to the surface, generally parallel thereto. In the exercising condition the support structure may be pivoted away from the surface, for example to cause the support portion to be spaced from the surface.

In one manner of attachment, the support structure may be attached to the surface so as to be maneuverable between the stowed and exercise conditions in a single plane. It may for example be attached by a hinge connection whereby the support structure can pivot in a single plane between the conditions.

In other possible arrangements, the support structure may be attached to the surface as to be maneuverable in more than one plane. This could be achieved by a universal joint, such as by a ball and socket, which allows pivoting in a single plane or pivoting in more than one plane.

In certain embodiments, the support structure is pivotable about a first axis perpendicular to the surface, and is pivotable about a second axis perpendicular to the first axis. In use, the support structure may be pivoted about the second axis whereby it pivots away from the surface, and it may then be pivoted about the first axis perpendicular to the surface. This arrangement is useful in a situation where one or more components of the support structure, such as a ground engaging leg, may be pivoted away from the surface before being pivoted to a position in which the exercise equipment will be used.

The support structure may have an arm member attached to the surface.

In embodiments having a stowed condition for the support structure, the arm member may be generally parallel to the surface when the support structure is in the stowed condition.

More generally, the arm member may project away from the surface when the support structure is in the exercising condition. It may project away from the surface perpendicularly thereto, for example perpendicularly to a vertical outside surface of a trailer, to a roof of a trailer, or to a wall of a ship or building. It may project in a substantially horizontal direction, for example if it projects from a vertically extending surface, when it may then connect to a ground engaging leg extending downwardly from the arm member to the ground; or the arm member may project upwardly, either upright or intermediate between horizontal and vertical for example, if it projects from a horizontally extending surface, such as a roof surface, when it may then connect to a cantilevered component of the support structure.

In the case of a support structure comprising a ground engaging leg, the engagement of the leg on the ground enables the support structure to take loading when it is being used, the loading arising for example from people using the exercise apparatus, such as to do pull-up or toes to bar, or to support weights.

In embodiments having a stowed condition for the support structure, when the support structure is in the stowed condition, the leg can be compactly positioned adjacent to the surface, such as a fixed wall or an outside surface of a land vehicle, e.g. a trailer.

A ground engaging leg may improve the stability of a land vehicle during exercise by a user, by preventing it from rocking on a suspension, for example. If more than one ground engaging leg is provided, e.g. on opposite sides of the land vehicle, then stability will be further enhanced.

The arm member and the ground engaging leg may together form an arm and leg unit, and this unit may have an upside down "L" shape. In the arrangements in which the support structure comprises an arm member connected to a ground engaging leg, it is useful if the arm member is attached to the surface so as to be movable in more than one plane. The arm member and the leg connected thereto may be pivoted so that the leg is moved away from the surface, and then pivoted into the exercising condition in which the leg engages the ground.

In embodiments having a stowed condition for the support structure, the ground engaging leg may be generally upright when the support structure is in the exercising condition, and be non-upright, for example horizontal, when the support structure is in the stowed condition. This can enable the length of the leg, which is required below a location at which the leg is supported, e.g. with respect to a trailer, for the leg to reach the ground in the exercising condition, to be accommodated e.g. on the surface, such as the outside of the trailer, in the stowed condition. For example, the leg may be stowed in a horizontal orientation, e.g. in a lengthwise direction of a trailer without projecting beyond the lengthwise ends of the trailer, or projecting only a small amount.

In the embodiments in which the support structure has at least two ground engaging legs, in the exercising condition the at least two legs may be spaced apart from each other. They may be interconnected by at least one connecting bar, such as an exercise bar.

In embodiments in which the support structure remains attached to the surface in the stowed condition, a first leg may extend adjacent to the surface, e.g. the outside of a trailer, and a second leg may extend next to the first leg. The first leg may then be between the second leg and the surface. Alternatively, both legs may be stowed adjacent to the surface, for example with one leg being positioned above the other.

There may be an arm member for each leg.

In some embodiments, each arm member may be pivotable about a first axis perpendicular to the outside of the trailer, and may be pivotable about a second axis perpendicular to the first axis. In that case, the second pivot axis of one arm member may be parallel to and offset from the second pivot axis of another arm member. This can allow the arm members, and preferably also the respective legs to which they are connected, to lie in offset planes, e.g. offset vertical planes, when the support structure, i.e. the plurality of arm and leg member units, is in the stowed condition. This may achieve the arrangement mentioned above in which a first leg extends adjacent to the surface, and a second leg extends next to the first leg with the first leg between the second leg and the surface.

In embodiments in which the support structure remains attached to the surface, a releasable restraining device may be provided to secure the support structure on the surface when it is in the stowed condition.

In the second or third aspect of the invention, or any embodiment in which the support structure adopts a stowed condition and at least one ground engaging leg is provided, the ground engaging leg or legs may be spaced from the ground, when the support structure is in the stowed condition, by at least 20 cm or 30 cm or 40 cm or 50 cm.

The exercise equipment of the training apparatus may comprise ground engaging exercise apparatus, which may have one or more ground engaging legs as discussed herein, or it may comprise cantilevered exercise apparatus, or it may comprise both ground engaging exercise apparatus and cantilevered exercise apparatus. In the latter case, the exercise equipment may have first and second support structures, one for the ground engaging exercise apparatus and the other for the cantilevered exercise apparatus. The support structure for the ground engaging exercise apparatus may be attached to a wall surface of a land vehicle, whilst the support structure for the cantilevered exercise apparatus may be attached to a wall or roof surface of the land vehicle.

Where both ground engaging exercise apparatus and cantilevered exercise apparatus are provided, this allows for different types of training exercise as well as enabling more than one person to train at one time.

The cantilevered exercise apparatus may have a cantilever component. When the cantilevered exercise apparatus is in an exercising configuration, the cantilever component may project away from the surface, e.g. the outside of the trailer, and not engage the ground. The cantilever component may be in the form of an exercise frame, having at least one exercise bar to be gripped by a user during exercise.

In embodiments in which the support structure remains attached to the surface, the cantilevered exercise apparatus may extend adjacent to the surface when in a stowed configuration. In the case that the cantilevered exercise apparatus is attached on a horizontal surface, such as on the roof of the trailer, it may then be in a generally horizontal plane when in the stowed configuration.

More generally, the cantilevered exercise apparatus may be attached to a vertically extending surface, such as the outside of a trailer at a side thereof, but in embodiments the cantilevered exercise apparatus is attached to a roof surface, for example a roof surface of a trailer.

The cantilevered exercise apparatus may be attached both to a side and to a roof of a land vehicle.

In embodiments, the cantilevered exercise apparatus remains attached to the surface during maneuvering between the stowed configuration and the exercising configuration.

In the embodiments in which the cantilevered exercise apparatus has a cantilever component which projects away from the surface and does not engage the ground when the apparatus is in the exercising configuration, free space can be created below the cantilever component to provide for training exercises, for example pull ups or using monkey bars. By attaching the cantilevered exercise apparatus to a surface of a land vehicle, sufficient vertical space can be easily created below the cantilever component to facilitate this type of exercise.

The cantilever component may extend upwardly in a direction intermediate between horizontal and vertical, when the cantilevered exercise apparatus is in the exercising configuration. This can assist with the creation of vertical space below the cantilever component. It can also enable the cantilever component to extend away from the surface as viewed from above. The cantilever component may project away from the surface, e.g. the outside of a trailer when the apparatus is in the exercising configuration and, for some embodiments, may extend adjacent to the surface, e.g. the outside of the trailer, for example horizontally, when the apparatus is in the stowed configuration.

In embodiments in which the cantilevered exercise apparatus has stowed and exercising configurations, the cantilever component may comprise a surface attachment portion which is located in a first position when said cantilevered exercise apparatus is in the stowed configuration and which is movable to a second position when said cantilevered exercise apparatus is in the exercising configuration, the surface attachment portion being attached to the surface when in said second position, for example by a releasable anchoring device.

The cantilever component may have a distal end portion remote from the surface attachment portion and at a free end of the cantilever component. When the exercise apparatus is in the exercising configuration, the cantilever component may be supported at a location thereon intermediate between the surface attachment portion and the distal end portion. It may be supported by an arm member.

The distal end portion may then be spaced apart from the surface. The distal end portion may be at a higher location than the surface attachment portion.

In embodiments in which the cantilever component has a surface attachment portion with first and second positions, the cantilever component may remain attached to the surface during the movement of the surface attachment portion from the first position to the second position. It may be arranged to slide and/or pivot, e.g. on the trailer roof, from the stowed configuration to the exercising configuration.

In certain embodiments, where an arm member and a cantilever component as mentioned above are provided, the arm member may be pivotally mounted to the surface, e.g. the outside of the trailer, so as to be able to pivot to its deployed mode in which it projects away from the surface, and the cantilever component may be pivotally mounted to the arm member about a cantilever component pivot axis. This pivot axis may be positioned intermediate the surface attachment portion and the distal end portion of the cantilever component.

In operation, in order for the cantilevered exercise apparatus to move from its stowed configuration to its exercising configuration, the arm member is pivoted away from the surface, e.g. the outside of the trailer, causing the cantilever component pivot axis to move away from the surface.

The surface attachment portion may then be fixed to the surface, whereby the cantilever component extends from its surface attachment portion, via the cantilever component pivot axis where it is supported by the arm member, to its distal end portion spaced apart from the surface. Thus the part of the cantilever component extending between the surface attachment portion thereof and the cantilever component pivot axis may act to stabilize the cantilevered exercise apparatus in the exercising configuration.

An exercise bar as mentioned above may be provided for ground engaging exercise apparatus and/or for cantilevered exercise apparatus. For example, where both types of apparatus are provided, each may have a respective exercise bar.

In the case of ground engaging exercise apparatus having at least two legs, the exercise bar may extend between the legs. It may function as the connecting bar mentioned above. The ground engaging exercise apparatus may comprise a plurality of horizontal exercise bars.

In the case of cantilevered exercise apparatus having a cantilever component, the cantilever component may comprise a horizontal exercise bar. This may be provided at or adjacent to the distal end portion of the cantilever component. The cantilever component may comprise a plurality of horizontal exercise bars.

In the case of a land vehicle comprising a trailer, the trailer may have (e.g. four) side walls and a roof. It may be a box, such as an ISO shipping container, removably secured on a flat bed, or it may be an integral construction. Because the equipment is on the outside of the trailer, the inside of the trailer is free to be used to store goods, supplies or other exercise equipment when the trailer is towed, i.e. during locomotion thereof.

BRIEF DESCRIPTION OF THE DRAWINGS

Preferred embodiments of the invention will now be described by way of example and with reference to the accompanying drawings, in which.

DETAILED DESCRIPTION

Figure 1:
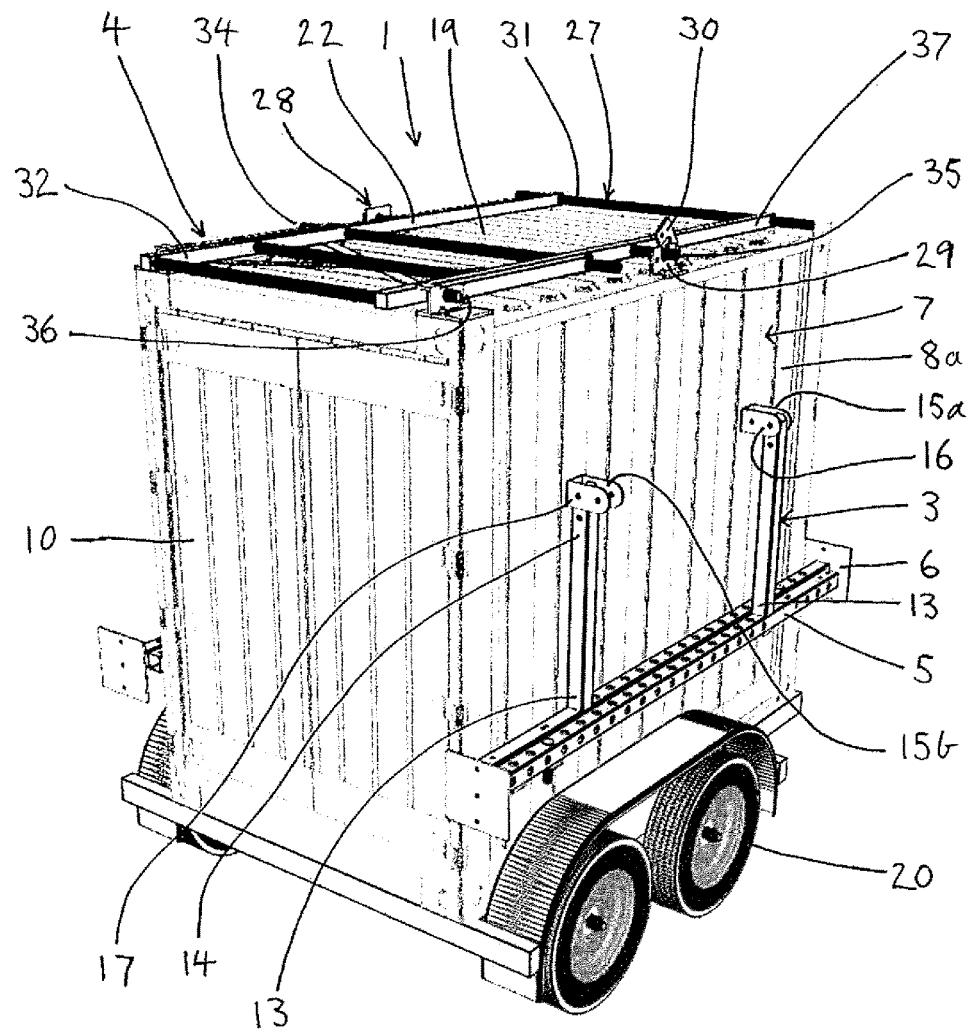
FIG. 1 is a perspective view of the training apparatus, viewed from the rear, with the exercise equipment in a stowed condition.

As seen in the drawings, training apparatus 1 comprises a land vehicle in the form of a trailer 2 provided with exercise equipment attached to the outside of the trailer. The trailer has wheels 20 enabling it to be transported by being towed by a vehicle.

The trailer 2 has an outside 7 which comprises two opposite lateral walls having outside side surfaces 8a and 8b, two opposite front and rear end walls having outside front and rear side surfaces 9 and 10, and a roof having a roof surface 19. At the front of the trailer 2 a tow bar 11 is provided. The rear side surface 10 comprises a pair of doors for gaining access to the inside of the trailer, where further exercise equipment or other material may be stored during transport of the trailer.

The exercise equipment comprises ground engaging exercise apparatus 3 and cantilevered exercise apparatus 4. In alternative embodiments, not shown, the exercise equipment may comprise only the ground engaging exercise apparatus 3, or only the cantilevered exercise apparatus 4, and it may comprise more than one ground engaging exercise apparatus 3 and/or more than one cantilevered exercise apparatus 4. In this embodiment, two ground engaging exercise apparatus 3 and one cantilevered exercise apparatus 4 are provided.

Figure 2:
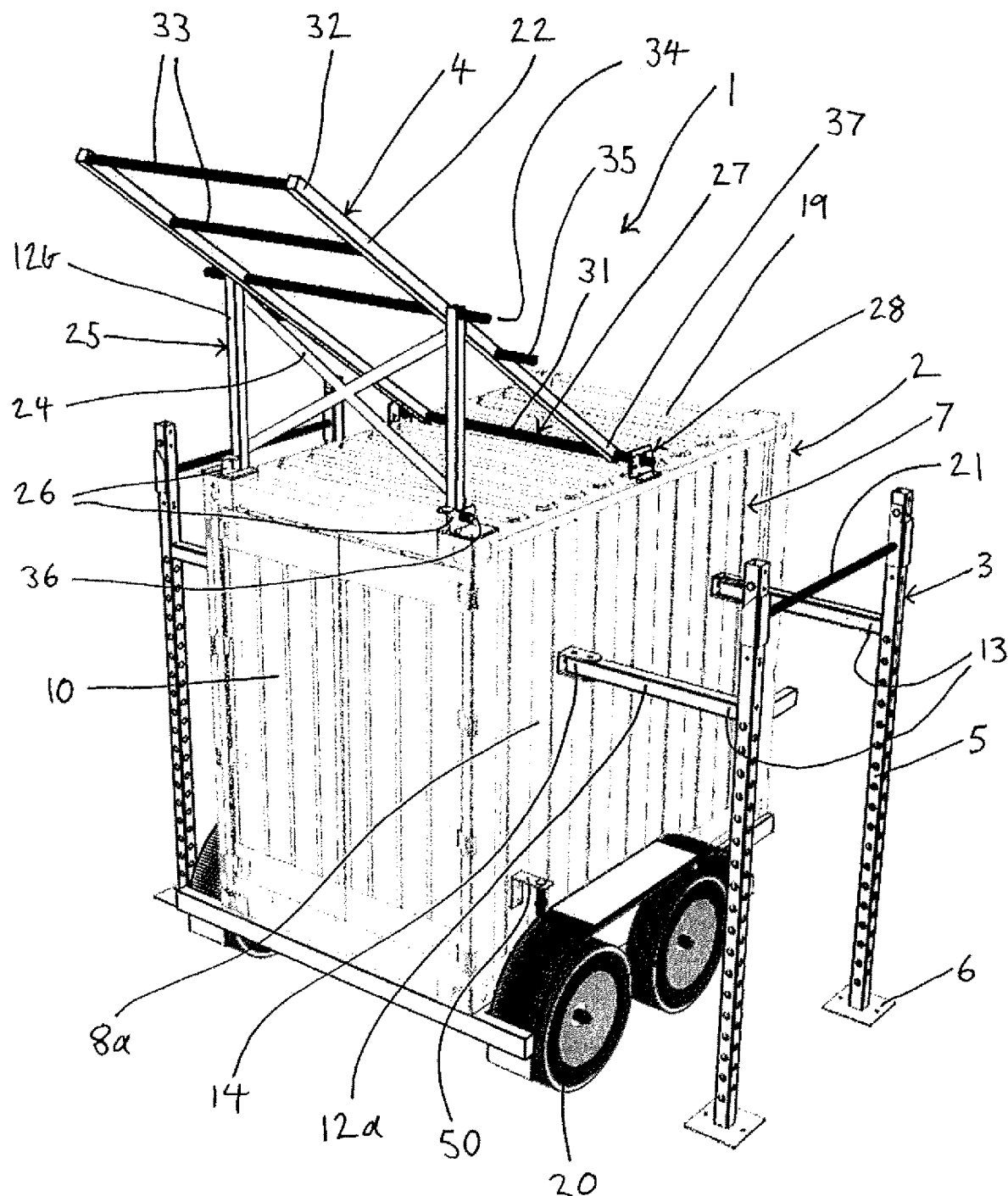
FIG. 2 is a perspective view of the training apparatus, viewed from the rear, with the exercise equipment in an exercising condition.
Figure 3:
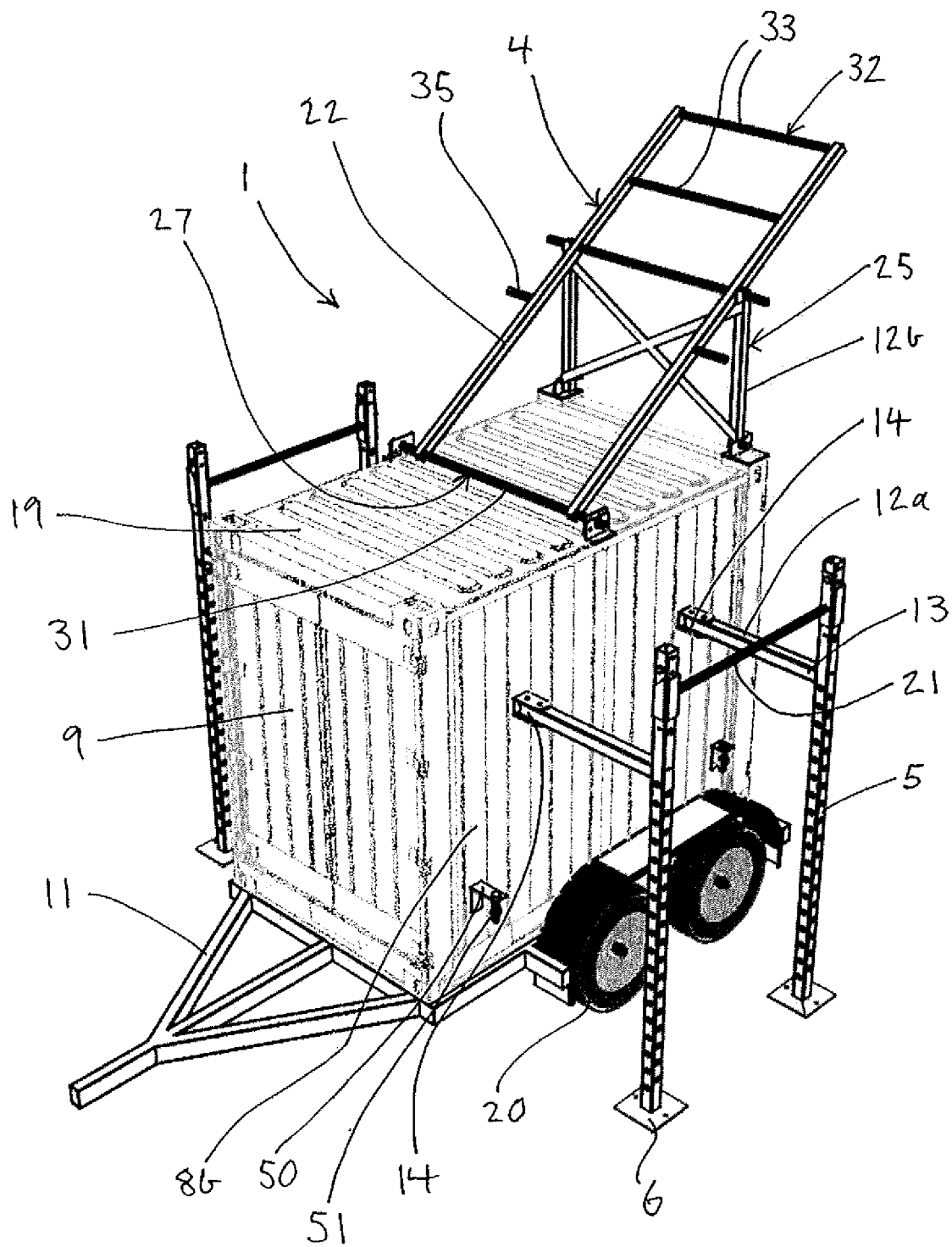
FIG. 3 is a perspective view of the training apparatus, viewed from the front, with the exercise equipment in the exercising condition.

FIG. 1 shows the exercise equipment, i.e. the ground engaging exercise apparatus 3 and the cantilevered exercise apparatus 4, in the stowed condition. FIGS. 2 and 3 show the exercise equipment in the exercising condition.

The ground engaging exercise apparatus 3 comprises a leg 5 which engages the ground when the apparatus is in an exercising configuration by means of a ground engaging plate 6. A pair of legs 5, each with a corresponding ground engaging plate 6, is provided, with the legs being spaced apart in a lengthwise direction of the trailer 2, whereby there are front and rear legs 5.

An arm member 12a extends between the trailer and each ground engaging leg 5, thereby forming respective leg and arm member units. The leg and arm member units together form a support structure of the ground engaging exercise apparatus 3. There are front and rear arm members 12a, respectively for the front and rear legs 5. Each arm member 12a has an end 13 rigidly secured to a respective leg 5, and an opposite end 14 connected to a respective "U"-shaped bracket 15a, 15b.

Figure 4:
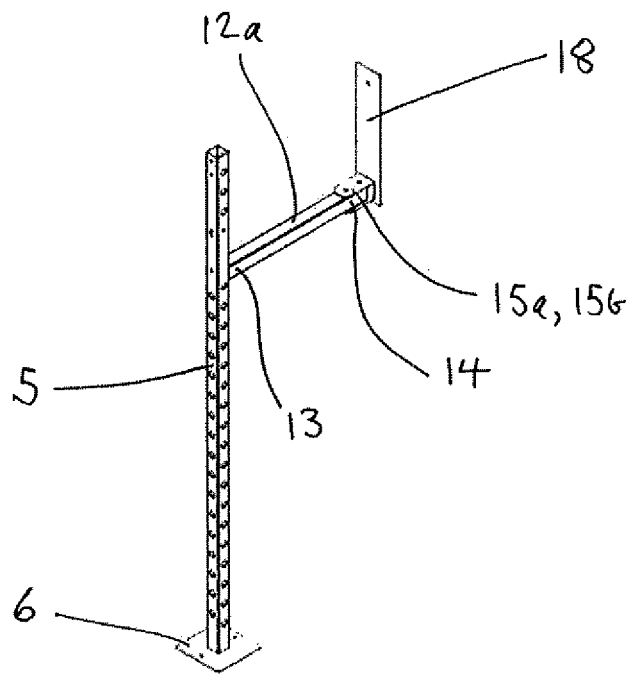
FIG. 4 is an isometric view of a leg of ground engaging exercise apparatus when the apparatus is in an exercising configuration.
Figure 5:
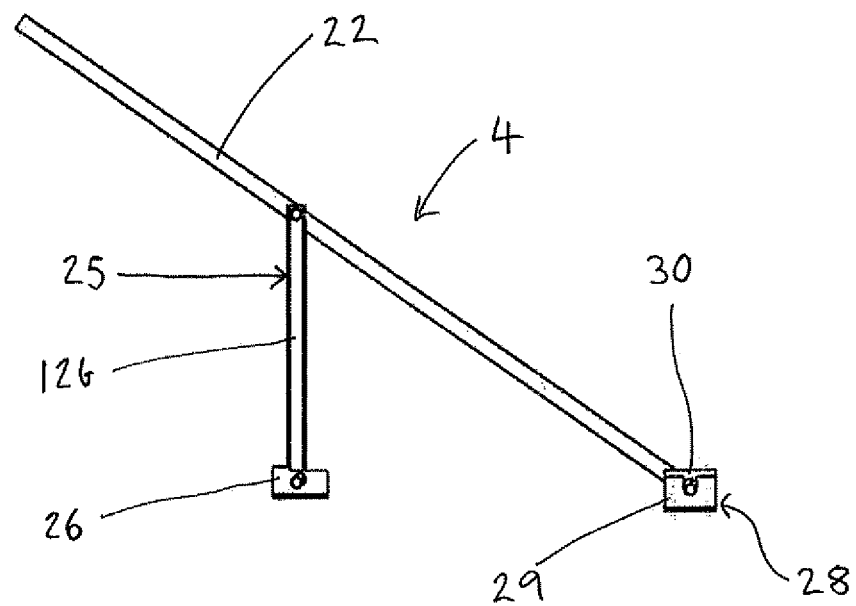
FIG. 5 is a side view of cantilevered exercise apparatus when the apparatus is in an exercising configuration.

Each bracket 15a, 15b is pivotally mounted on a respective support plate 18, as seen in FIG. 4. Each support plate 18 is bolted or welded on the inside of lateral side surface 8 of the trailer 2 (and hence is not seen in FIG. 1, 2 or 3). Alternatively, it may be welded in place. Thus, each support plate 18 is rigidly mounted to the trailer and defines a respective first pivot axis, perpendicular to the lateral side surface 8 of the trailer and about which a respective "U"-shaped bracket 15a, 15b is rotatable. It may be rotatable about the shank of a bolt (not shown).

The bracket 15a is nearer to the front of the trailer and will be referred to as the front bracket 15a, while bracket 15b is nearer to the rear of the trailer and will be referred to as the rear bracket 15b. Front bracket 15a has a pair of distal holes 16 each provided on a respective limb of the "U" and defining a second pivot axis for the second end 14 of the front arm member 12a. The second pivot axis defined by holes 16 is in a plane generally parallel to the outside lateral side surface 8a of the trailer, i.e. a vertical plane. The second pivot axis is perpendicular to the first pivot axis of the front "U"-shaped bracket 15a.

Rear bracket 15b has a pair of proximal holes 17 each provided on a respective limb of the "U" and defining a second pivot axis for the second end 14 of the rear arm member 12a. The second pivot axis defined by holes 17 is in a plane generally parallel to the outside lateral side surface 8a of the trailer, i.e. a vertical plane. The second pivot axis is perpendicular to the first pivot axis of the rear "U"-shaped bracket 15b. The vertical plane of the second pivot axis defined by the holes 17 for the rear arm member 12a is closer to the outside lateral side surface 8a than the vertical plane of the second pivot axis defined by the holes 16 for the front arm member 12a.

The arm member 12a for each leg 5 may be pivoted about the respective second pivot axes defined by the holes 16 or 17 in the respective "U"-shaped brackets 15a or 15b, and each of these brackets may be rotated about a respective first pivot axis perpendicular to the outside lateral side surface 8a of the trailer. The result is that each arm member 12a is attached to the outside of the trailer so as to be movable in more than one plane. In this embodiment the first pivot axes are horizontal.

FIGS. 2 and 3 show a pair of leg holding brackets 50 secured to the outside lateral side surface 8a. Each bracket 50 has a horizontally projecting limb formed with a vertical hole through which a respective hitch pin 51 passes. When the legs 5 are stowed as shown in FIG. 1, the hitch pins pass through holes in the legs and through the vertical holes in the brackets 50, to hold the legs in the stowed condition.

As seen in FIGS. 2 and 3, a connecting bar 21 is secured between the front and rear legs 5 and provides an exercise bar, for example to do pull-ups.

In use, with the exercise equipment in the stowed condition, the trailer 2 is towed to a site where the exercise equipment is to be used. At the deployment site, the hitch pins 51 are lifted to release the legs to permit movement of the ground engaging exercise apparatus 3 from the stowed configuration to the exercising configuration. In the stowed configuration, the front leg 5 and arm member 12a unit is positioned laterally outwardly of the trailer relative to the rear leg 5 and arm member 12a unit, and so the front unit is moved first. The front arm member 12a is pivoted upwardly about the second pivot axis defined by the distal holes 16 in the "U"-shaped bracket 15a. Subsequently, the bracket 15a is rotated anticlockwise about the first pivot axis perpendicular to the lateral side surface 8a of the trailer, bringing the ground engaging plate 6 at the bottom of the leg 5 into engagement with the ground. A similar operation is carried out on rear leg 5 and arm member 12a unit, with the difference that rotation about the first pivot axis for that unit is carried out in the clockwise direction. The connecting bar 21, which may be stored inside the trailer during towing thereof, is then secured between the front and rear legs 5.

The ground engaging exercise apparatus 3 is then ready for use. By engaging the ground the legs 5 act as stabilizing members which stabilize the exercise equipment, in particular the ground engaging exercise apparatus, in the exercising condition.

Since the front and rear legs 5 are moved independently, a user must deal with the weight of each leg one at a time. This makes the exercise equipment easy to deploy and, after use, to stow.

The leg 5 and arm member 12a units together form a support structure of the ground engaging exercise apparatus 3. When the support structure is in the exercising condition shown in FIGS. 2, 3 and 4, the ground engaging legs are in a first, vertical orientation. When the support structure is in the stowed condition shown in FIG. 1, the ground engaging legs are in a second, horizontal orientation, whereby they occupy less vertical space than when in the first, vertical orientation. The leg 5 and arm member 12a units when stowed thus do not project above or below the lateral side surfaces 8a, 8b, and the length of the trailer is made use of in accommodating the length of the legs 5, so that they do not project in front of or behind the trailer, or project only to a small extent. This is to be contrasted with a situation if the ground engaging legs were to pivot upwardly about the brackets 15a, 15b in a generally vertical plane, in which case they would project above the roof of the trailer.

The cantilevered exercise apparatus 4 will now be described with reference to FIGS. 1, 2, 3 and 5. The cantilevered exercise apparatus comprises a cantilever component, in the form of an exercise frame 22, and a support frame 25. The support frame 25 comprises a pair of arm members 12b connected together by a pair of diagonal brace members 24. A pair of laterally spaced support frame brackets 26 are secured on the roof surface 19 of the trailer 2. The support frame 25 is pivotally mounted by the support frame brackets 26 so as to be rotatable about a support frame pivot axis 36 between a generally horizontal position as seen in FIG. 1, when the cantilevered exercise apparatus 4 is in its stowed configuration, and a generally vertical position as seen in FIG. 2, when the apparatus 4 is in the exercising configuration. Thus the arm members 12b have pivotally mounted ends and free ends remote therefrom. The support frame pivot axis 36 is horizontal.

The exercise frame has a proximal end portion 37 and a distal end portion 32.

The exercise frame 22 is pivotally mounted to the free ends of the arm members 12b of the support frame 25, about an exercise frame pivot axis 34. The exercise frame 22 has at its proximal end portion 37 a trailer attachment portion 27 which is releasably fixed to the trailer when the cantilevered exercise apparatus is in the exercising configuration shown in FIG. 2, by a releasable anchoring device 28. The releasable anchoring device 28 comprises a pair of anchoring brackets 29 laterally spaced from each other and fixed to the roof surface 19 of the trailer 2 in a position forwardly of the support frame brackets 26. A clamp member 30 is pivotally mounted to each anchoring bracket 29.

In FIG. 1 the clamp member 30 on the right hand side of the roof surface 19 is shown partially open. The clamp members 30 may be pivoted to an open position to allow a lateral bar 31 of the trailer attachment portion 27 of the exercise frame 22 to be received in a "U"-shaped socket provided in the anchoring bracket 29. The clamp member 30 is also provided with a "U"-shaped socket which, when the clamp member 30 is pivoted to the closed position engages the lateral bar 31 of the exercise frame to clamp it in position. At this time, the exercise frame 22 extends upwardly and horizontally, supported by the support frame 25 at a location intermediate between the trailer attachment portion 27 held by the anchoring brackets 29 and clamp members 30 and the distal end portion 32 at the projecting end of the exercise frame 22.

The exercise frame 22 has a pair of lateral exercise bars 33 disposed outwardly of the footprint of the trailer (as viewed from above). These extend horizontally, both when the cantilevered exercise apparatus 4 is in its stowed configuration and when it is in its exercising configuration.

The exercise frame 22 has a pair of laterally projecting locking bars 35 disposed intermediate between the exercise frame pivot axis 34 and the proximal end portion 37. When the cantilevered exercise apparatus is in the stowed configuration seen in FIG. 1, it may be locked in this position by the locking bars 35 engaging in the clamp member 30 so that it is secure during towing of the trailer. In the stowed configuration, the substantially the entire cantilevered exercise apparatus lies in a generally horizontal plane.

In use, when the trailer has been transported to a deployment site, the releasable anchoring device 28 is operated to release the locking bars 35. The support frame 25 is pivoted about its pivot axis 36 from the horizontal to a vertical position, thereby causing the exercise frame pivot axis 34 to move away from the roof surface 19 of the trailer 2. The trailer attachment portion 27 of the exercise frame 22 is maneuvered so that its lateral bar 31 engages with the anchoring brackets 29, where it clamped by the anchoring brackets 29 and clamp members 30 of the releasable anchoring device 28. At this time, the distal end portion 32 projects upwardly and outwardly of the trailer to place the exercise bars 33 in an elevated position for exercising purposes.

Figure 6:
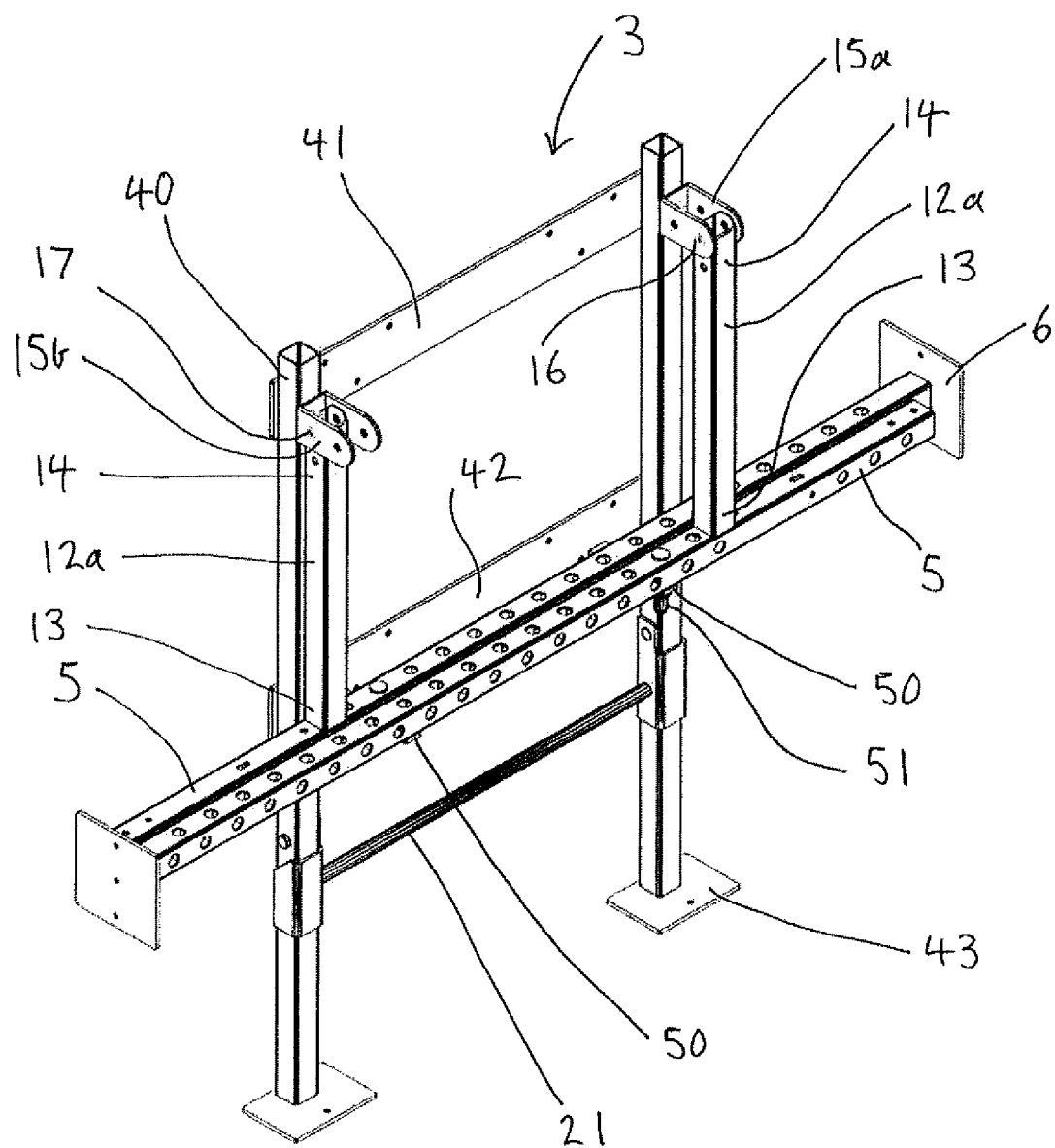
FIG. 6 is an isometric view of another embodiment of training apparatus comprising ground engaging exercise apparatus in a stowed configuration.
Figure 7:
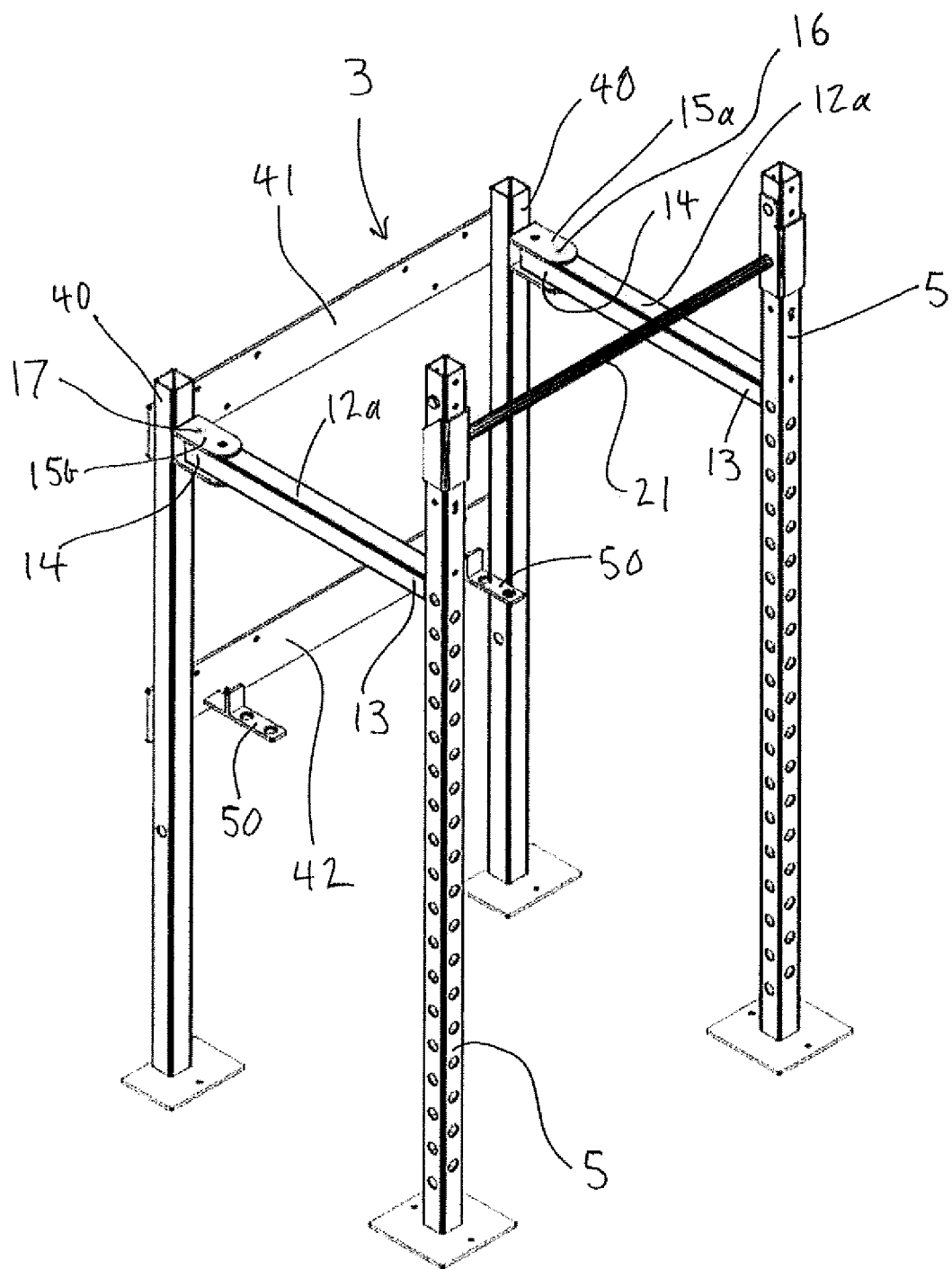
FIG. 7 is an isometric view of the ground engaging exercise apparatus of FIG. 6 in an exercising configuration.

FIGS. 6 and 7 show another embodiment of a training apparatus comprising ground engaging exercise apparatus 3 suitable for mounting to any wall (not shown), not necessarily that of a land vehicle, for example a fixed wall of a building or a ship. The ground engaging exercise apparatus comprises a pair of upright posts 40 spaced apart from each other and each having a floor plate 43 for resting on a floor, e.g. of a ship or a building. An upper wall mounting plate 41 extends between the two upright posts and includes holes for receiving bolts to enable the upper wall mounting plate 41 to be secured to a wall. A lower wall mounting plate 42 is downwardly spaced from the upper wall mounting plate 41 and also extends between the two upright posts 40 and has holes to allow it to be bolted to the wall.

In the stowed configuration of the ground engaging exercise apparatus 3 shown in FIG. 6, the connecting bar 21, to be used as an exercise bar, is stowed by being supported between the two upright posts 40. As seen in FIG. 7, which shows the ground engaging exercise apparatus 3 in the exercising configuration, the connecting bar 21 has been moved from the upright posts 40 so that it extends between the ground engaging legs 5.

In other respects, the ground engaging exercise apparatus 3 is generally the same as that described in relation to the first embodiment, and corresponding reference numbers are used.

The operation of the ground engaging exercise apparatus 3 of FIGS. 6 and 7 also corresponds to that described in relation to the first embodiment. In particular, each leg 5 and arm member 12a unit is independently maneuvered between the stowed and exercising conditions, so that a user need only deal with the weight of each unit one at a time.

The leg 5 and arm member 12a units together form a support structure of the ground engaging exercise apparatus 3. When the support structure is in the exercising condition shown in FIG. 7, the ground engaging legs are in a first, vertical orientation. When the support structure is in the stowed condition shown in FIG. 6, the ground engaging legs are in a second, horizontal orientation, whereby they occupy less vertical space than when in the first, vertical orientation. This is to be contrasted with the amount of vertical space which would be required if the ground engaging legs were to pivot upwardly about the brackets 15a, 15b in a generally vertical plane, in which case a substantial amount of headroom would be required above the upright posts 40 to accommodate the vertical space then occupied by the legs 5.

It will therefore be seen that by allowing the ground engaging legs to have different orientations when stowed and when deployed the exercise equipment can be used in places where there is restricted headroom.

The invention claimed is:

1. A training apparatus comprising a trailer which comprises:
   a container;
   wheels enabling the trailer to be transported by being towed by an associated vehicle; and
   exercise equipment;
   wherein the exercise equipment comprises a support structure which is stowed during towing of the trailer, and which is configured to adopt an exercising condition attached to the container when the trailer is stationary;
   wherein the support structure comprises first and second vertically extending components each configured to extend vertically at a spacing from the container with the vertically extended components horizontally spaced apart when the support structure is in the exercising condition;
   wherein the support structure comprises first and second arm members each configured so that when the support structure is in the exercising condition each arm member projects in a direction away from the container with the arm members being horizontally spaced apart, with the first arm member having an end rigidly secured to the first vertically extending component and an opposite end connected to the container, and with the second arm member having an end rigidly secured to the second vertically extending component and an opposite end connected to the container; and
   wherein the support structure is maneuverable by pivoting with respect to the container whilst remaining attached thereto, between a stowed condition for use during towing of the trailer, and the exercising condition for use when the trailer is stationary.

2. The training apparatus of claim 1, wherein the vertically extending components are independently maneuverable with respect to each other when the support structure is maneuvered between the stowed condition and the exercise condition.

3. The training apparatus of claim 1, wherein the support structure is configured to support weights when in the exercise condition.

4. The training apparatus of claim 1, wherein the stowed condition the first vertically extending component and the second vertically extending component are configured to extend adjacent to a surface of the container.

5. The training apparatus of claim 1, wherein the first and second arm members are configured to project in a substantially horizontal direction in the exercise condition.

6. The training apparatus of claim 1, wherein the support structure is maneuverable between the stowed and exercise conditions in a single plane.

7. The training apparatus of claim 1, wherein the support structure is maneuverable between the stowed and exercise conditions by pivoting about a vertical axis.

8. The training apparatus of claim 1, wherein the exercise equipment comprises a cantilevered exercise apparatus having a cantilever component which projects in a direction away from the container and does not engage the ground when said cantilevered exercise apparatus is in an exercising configuration.

9. The training apparatus of claim 8, wherein the cantilever component extends upwardly in a direction intermediate between horizontal and vertical, when the cantilevered exercise apparatus is in the exercising configuration.

10. The training apparatus of claim 8, wherein the cantilever component is maneuverable by pivoting with respect to the container whilst remaining attached thereto, between a stowed condition for use during towing of the trailer, and the exercising condition for use when the trailer is stationary.

11. The training apparatus of claim 8, wherein the cantilevered exercise apparatus comprises at least one exercise bar to be gripped by a user during exercise.

12. The training apparatus of claim 8, wherein the cantilevered exercise is configured to be secured to the container at an attachment; and wherein the at least one exercise bar is configured to be supported by the cantilevered exercise apparatus at a vertical position higher than the attachment in the exercising condition.

13. A training apparatus comprising a container, the container having exercise equipment;
   wherein the exercise equipment is configured to adopt a stowed condition and an exercising condition attached to the container for use for exercise;
   wherein the exercise equipment comprises a cantilevered exercise apparatus comprising a cantilever component which is attached to a side of the container and which projects in a direction away from the container and does not engage the ground when said cantilevered exercise apparatus having at least one exercise bar supported by the cantilever component and to be gripped by a user during exercise, and the cantilevered exercise apparatus having a distal end and a proximal end, the proximal end of the cantilevered exercise apparatus being located at and fixed to the container at an attachment when the cantilevered exercise apparatus is in both the exercising and stowed configuration, and the distal end being spaced apart from the surface at a higher location than the attachment; and
   wherein the cantilever component is maneuverable by pivoting with respect to the container whilst remaining attached thereto, when the exercise equipment is moved between the stowed condition and the exercising condition.

14. The training apparatus of claim 13, wherein the exercise bar extends horizontally.

15. The training apparatus of claim 13, wherein the exercise bar is provided at or adjacent to said distal end.

16. The training apparatus of claim 13, wherein the cantilevered exercise apparatus comprises a plurality of exercise bars.

17. A training apparatus comprising a trailer which comprises:
   a container;
   wheels enabling the trailer to be transported by being towed by an associated vehicle; and
   exercise equipment;
   wherein the exercise equipment comprises a support structure configured to adopt a stowed condition and an exercising condition attached to the container for use for exercise;
   wherein the support structure comprises first and second vertically extending components each configured to extend vertically at a spacing from the container with the vertically extending components horizontally spaced apart when the support structure is in the exercising condition;
   wherein the support structure comprises first and second arm members each configured so that when the support structure is in the exercising condition each arm member projects in a direction away from the container with the arm members being horizontally spaced apart, with the first arm member having an end rigidly secured to the first vertically extending component and an opposite end connected to the container, and with the second arm member having an end rigidly secured to the second vertically extending component and an opposite end connected to the container;
   wherein the support structure is configured to support weights when in the exercise condition.

18. The training apparatus of claim 17, wherein the weights are liftable from the support structure to be used for squats or other weight training exercises.

19. The training apparatus as claimed in claim 1, further comprising first and second supports for supporting the respective opposite ends of the first and second arm members when the support structure is in the exercising condition, with the supports each being bolted or welded to a wall of the container.

20. The training apparatus of claim 1 wherein:
   the opposite end of the first arm member is connected to the container by a first connection including a first support mounted by being bolted or welded to the container, and wherein the opposite end of the second arm member is connected to the container by a second connection including a second support rigidly mounted by being bolted or welded to the container.

* * * * *